INVENTOR.
STANLEY B. WHITE

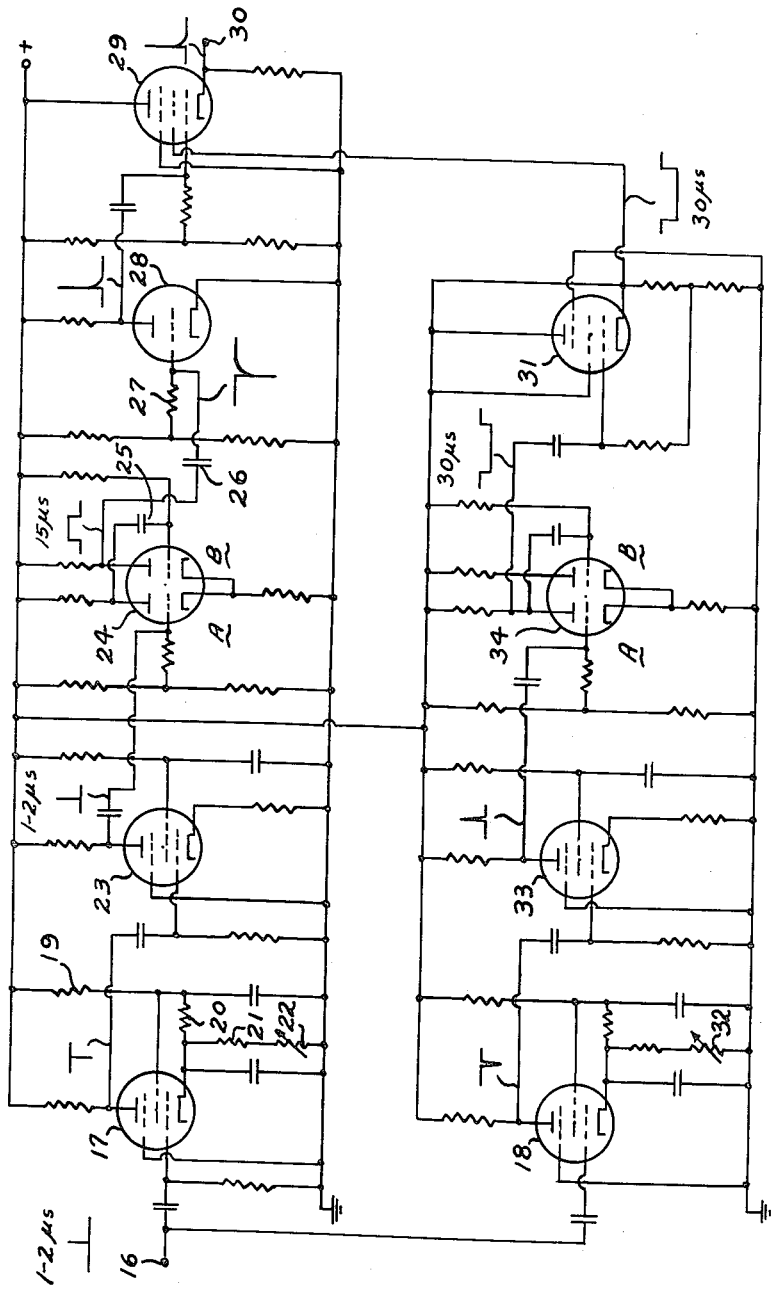

Jan. 30, 1962 S. B. WHITE 3,019,433
RADAR COUNTERMEASURE
Filed March 27, 1959 6 Sheets-Sheet 4

INVENTOR.
STANLEY B. WHITE
BY
ATTORNEY
AGENT

Jan. 30, 1962     S. B. WHITE     3,019,433
RADAR COUNTERMEASURE
Filed March 27, 1959     6 Sheets-Sheet 5

INVENTOR.
STANLEY B. WHITE
BY Wade County
ATTORNEY
James N. Shannon
AGENT

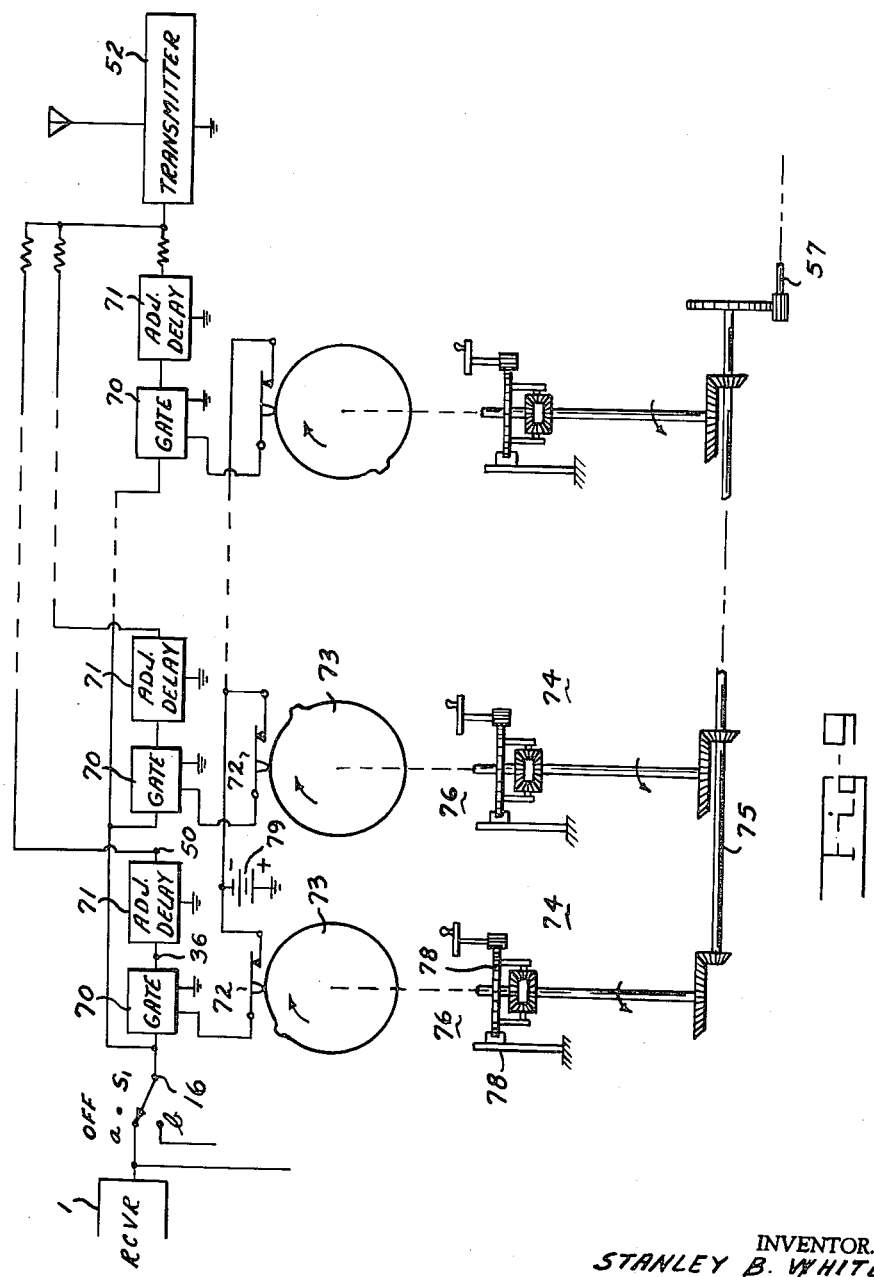

United States Patent Office 3,019,433
Patented Jan. 30, 1962

3,019,433
RADAR COUNTERMEASURE
Stanley B. White, Dayton, Ohio, assignor to the United States of America as represented by the Secretary of the Air Force
Filed Mar. 27, 1959, Ser. No. 802,576
5 Claims. (Cl. 343—18)
(Granted under Title 35, U.S. Code (1952), sec. 266)

The invention described herein may be manufactured and used by or for the United States Government for governmental purposes without payment to me of any royalty thereon.

The purpose of this invention is to provide a technique and implementing apparatus for confusing an EW (early warning) or GCI (ground control intercept) radar system, or the like.

The confusion is produced by effecting responses to the side lobes rather than the main lobe of the searching radar antenna pattern and through delaying the responses by varying amounts relative to the received radar pulses to produce a large number of false targets on the ground station P.P.I. (plan position indicator) at various ranges and azimuths. The responses are effected by a radar beacon carried by the aircraft to be protected and incorporating a pulse height discriminator to limit response of the beacon to the side lobes of the searching radar antenna lying within a predetermined amplitude range.

Figure 1:
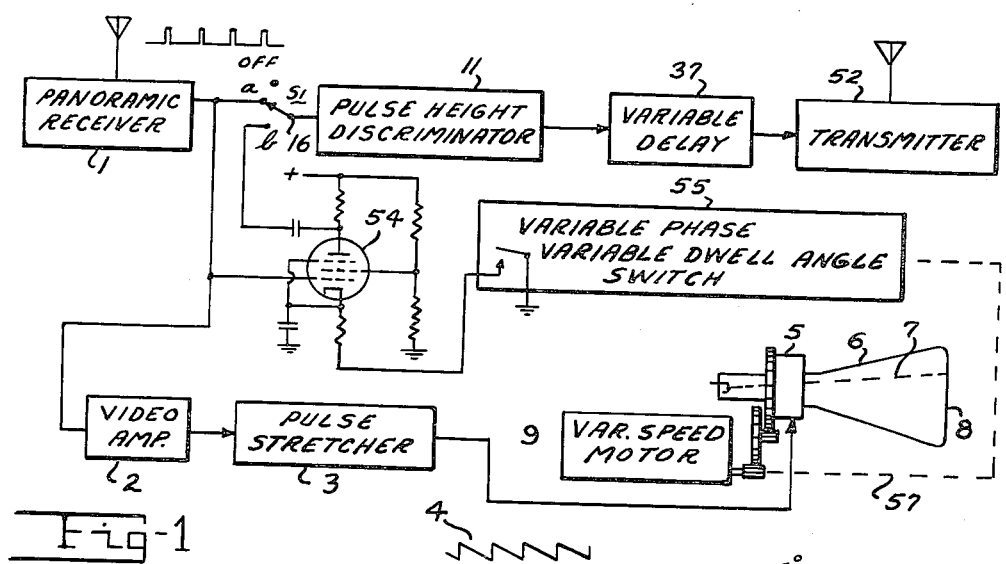
Figure 2:
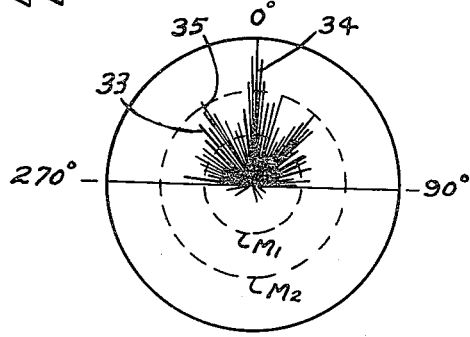
Figure 4A:
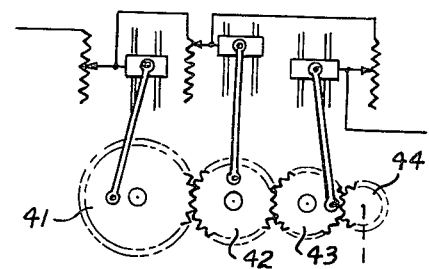
Figure 4B:
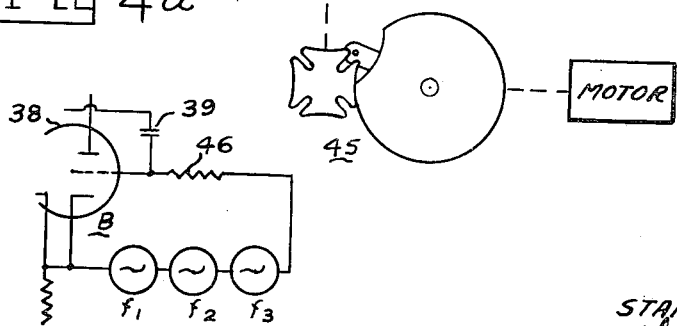
Figure 3:
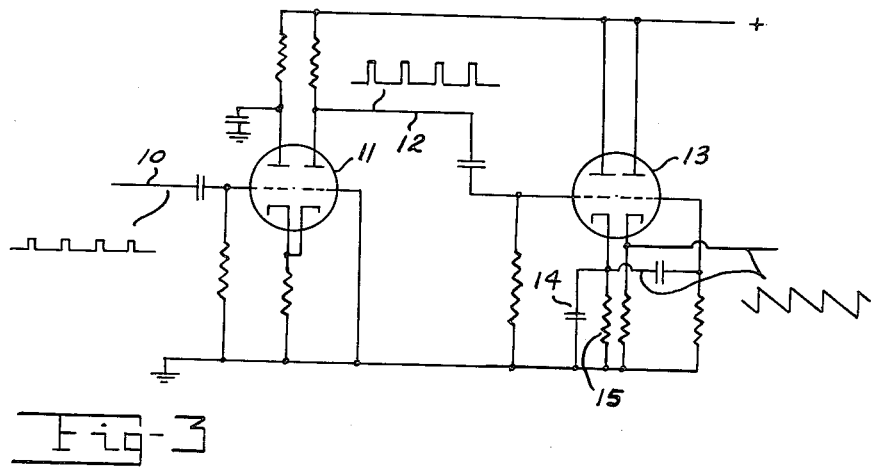
Figure 5:
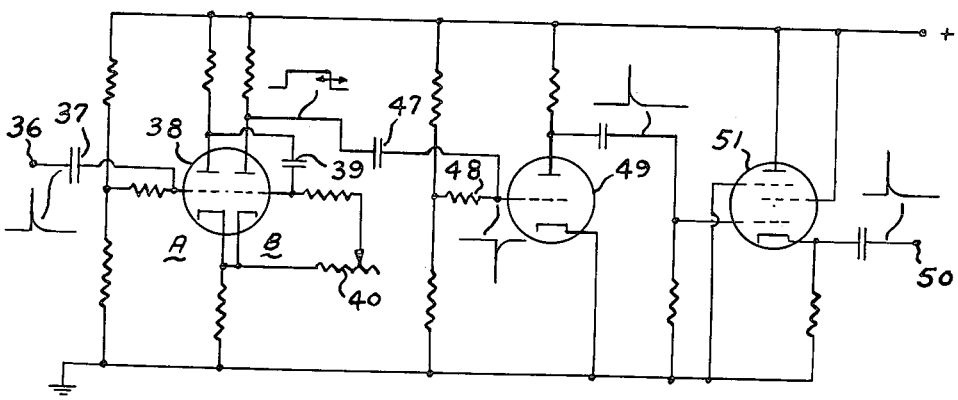
Figure 6:
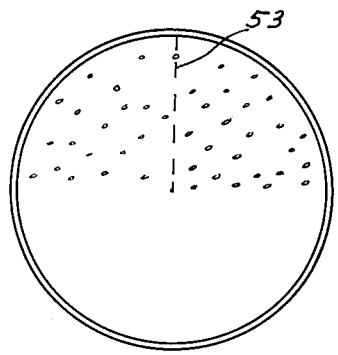
Figure 7:
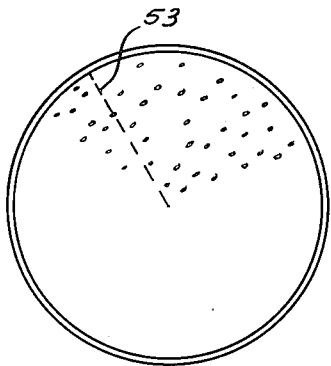
Figure 10:
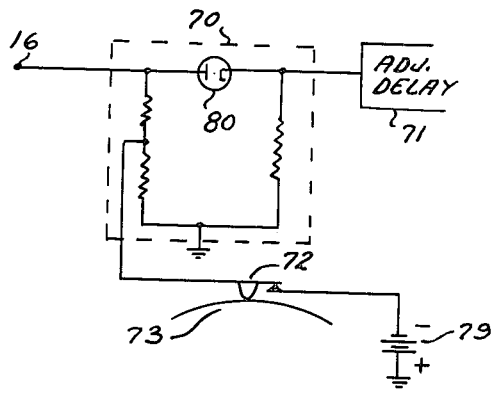
Figure 8A:
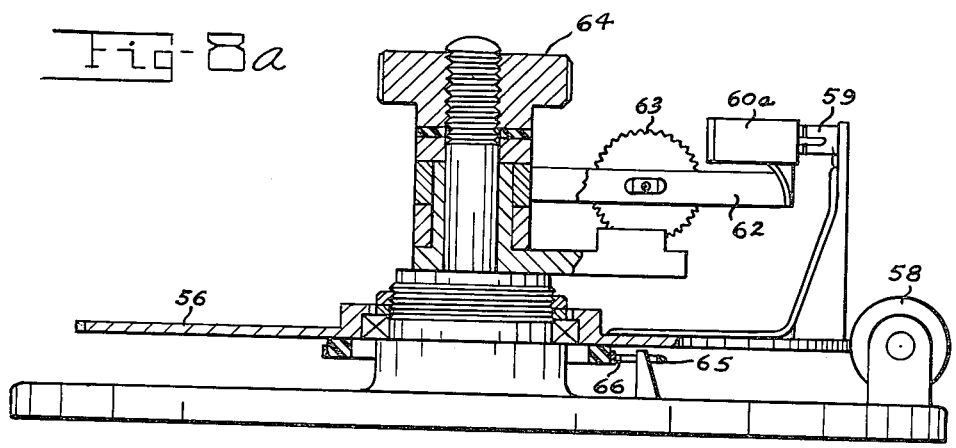
Figure 8B:
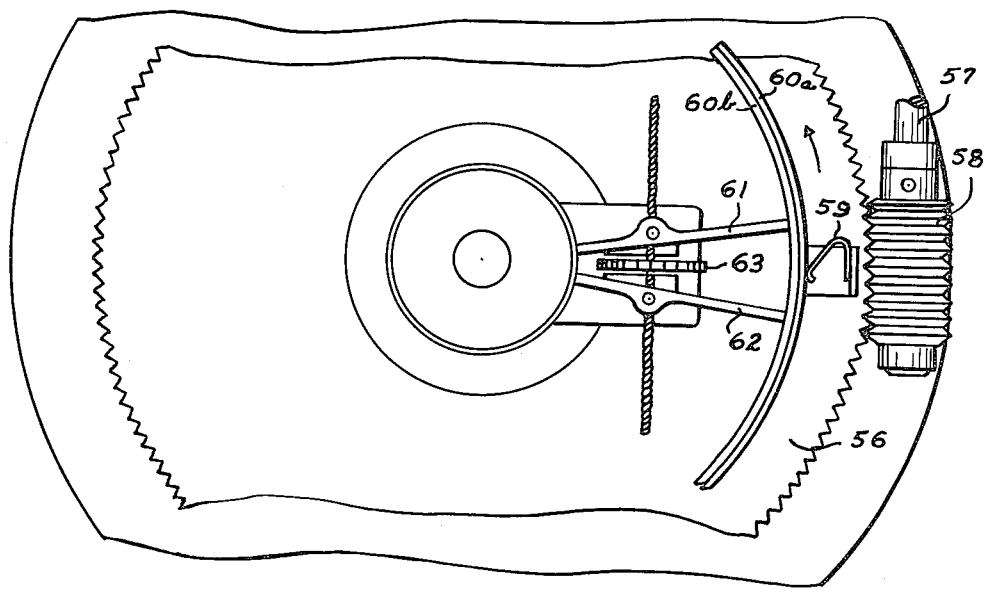

In a modification of the invention, the beacon responds to all lobes of the searching antenna and a gating circuit is utilized to produce false targets that have true target simulating movement over the screen of the P.P.I. A more detailed description of the apparatus will be given with reference to the specific embodiment shown in the accompanying drawings in which:

FIG. 1 is a block diagram of the apparatus;
FIG. 2 shows a typical search antenna pattern as represented on the screen of cathode ray tube 6;
FIG. 3 is a schematic diagram of the pulse height discriminator;
FIG. 4 shows a variable delay circuit;
FIGS. 4a and 4b show ways of producing irregular delays in FIG. 4;
FIG. 5 shows detail of the pulse stretcher;
FIGS. 6 and 7 show false target patterns produced by the invention;
FIGS. 8a and 8b show details of a suitable variable phase, variable dwell angle switch; and
FIGS. 9 and 10 show a modification of the invention for producing continuously moving false targets.

Surveillance radar systems such as the EW and GCI systems mentioned above are well-known in the art. Essentially they consist of a ground radar station having a large directional antenna which is rotated usually through 360° so that the beam scans in all directions around the ground station. Short pulses of high frequency energy are periodically radiated by the antenna with sufficient separation between pulses to allow time for the energy to travel to the maximum range and return. The reflected energy from any target illuminated by the antenna beam is received through the same antenna and applied to a P.P.I. The P.P.I. comprises a cathode-ray tube in which the beam is deflected radially from the center of the fluorescent screen at each radiated pulse, in a direction corresponding to the direction of the main lobe of the antenna. The beam of the cathode-ray tube, which is normally biased beyond cutoff, is momentarily turned on by the reflected energy producing a spot of light on the cathode-ray tube screen at a distance and direction from the center corresponding to the range and azimuth of the target. In this manner a plan view of the area surrounding the ground station showing the relative positions of the targets is produced.

Assuming the ground radar station to be an enemy station, FIG. 1 shows a block diagram of apparatus in accordance with the invention to be carried by an aircraft for the purpose of confusing the ground station as to the aircraft's position. The purpose of panoramic receiver 1 is first to locate the enemy station in the frequency spectrum and then to act as a receiver tuned to this frequency. Panoramic receivers are well-known in the art, a suitable receiver of this type being described in U.S. Patent No. 2,490,045 to Gardner et al. The receiver automatically scans over the frequency band known to contain the enemy radar and is equipped with an indicator to show the frequency of all signals received in the scanned band. When the frequency of the ground station has been determined in this manner the receiver tuning is then locked on this frequency.

In order to be able to observe the relative amplitudes of the signals emitted in the various lobes of the ground station antenna pattern and to observe the configuration of this pattern, the video output of receiver 1, after amplification in video amplifier 2, is applied to pulse stretcher 3, to be described later, which produces a sawtooth wave 4 having a peak amplitude proportional to the amplitude of the received radar pulses. The sawtooth wave 4 is applied to the deflection coil 5 of a cathode-ray tube 6 and causes the beam 7 of this tube to be immediately deflected radially from the center of the fluorescent screen 8 by an amount proportional to the amplitude of the sawtooth wave and to return relatively slowly to the center along the sloping portion of the wave. This produces a radial line of light on the screen having a length proportional to the received radar pulse amplitude. In order to produce the radiation pattern of the ground antenna on screen 8 the deflection coil 5 is rotated at the same speed as the ground station antenna by motor 9. The correct speed is obtained by adjusting the speed of motor 9 until a stationary pattern is obtained on the cathode-ray tube screen. Errors in speed are indicated by a rotation of this pattern either clockwise or counterclockwise depending upon the sign of the error. With switch $S_1$ in the "off" position only the radiation from the ground station is indicated on screen 8, the appearance of which may be as shown in FIG. 2.

The circuit details of pulse stretcher 3 are shown in FIG. 3. The echo pulses in the output of video amplifier 2 are applied over conductor 10 to the input grid of a two-stage cathode coupled video amplifier 11. The amplified pulses, unchanged in polarity, appear on conductor 12 and are applied over a suitable coupling network to the grid of the first section of tube 13. These pulses rapidly change condenser 14 through the relatively low impedance of tube 13 and the condenser then discharges more slowly through the relatively high resistance 15. The second section of tube 13 acts as a cathode follower output stage for the pulse stretcher.

With switch $S_1$ on contact "a" the video output of receiver 1 is also applied to input terminal 16 of pulse height discriminator 11. The details of this circuit are shown in FIG. 4. The video output pulses of the receiver, which may have a duration of from 1 to 2 microseconds, are applied simultaneously to the control grids of tubes 17 and 18. Tube 17 is biased below the cutoff point by the positive potential on its cathode produced by the potential divider made up of resistors 19, 20, 21 and 22, the last being variable so that the magnitude of the bias may be adjusted. An output from tube 17 will occur only when the amplitude of the pulse applied to its grid exceeds a minimum value determined by the bias. When this minimum value is exceeded a negative pulse appears at the output of this stage. This pulse is amplified and inverted by tube 23 and applied as a positive pulse to the grid of section A of tube 24. The two sections of this tube comprise a cathode coupled monostable multivibrator the construction and operation of which are well understood in the art. This circuit has a stable state in which section B is conductive and section A is cutoff, and an unstable state in which section A is conductive and section B is cutoff. The length of time the circuit remains in the unstable state is determined by the time constant of the discharge circuit for condenser 25. During each complete cycle of operation, in which the circuit passes from the stable state to the unstable state and back to the stable state, a positive pulse is generated at the anode of section B. In the circuit shown, the time constant is made such that the duration of this pulse is 15 microseconds. The generation of this pulse is initiated when the positive pulse applied to the grid of section A from tube 23 starts conduction in this section and thereby causes a transition to the unstable state.

The 15 microsecond pulse at the anode of section B is differentiated by the differentiating circuit comprising condenser 26 and resistor 27 to produce sharp positive and negative pulses at the leading and trailing edges, respectively. However, since the grid of tube 28 can not go positive relative to the cathode, only the negative pulse, corresponding to the trailing edge, appears on this grid. This pulse produces a coincident positive pulse on the anode of tube 28 and the control grid of gated or coincidence cathode follower 29. This produces a positive pulse on the output terminal 30 provided the screen grid of tube 29 is at proper operating potential. This potential is derived from the cathode of tube 31 the circuit of which tube is designed to provide the proper operating potential to the screen grid of tube 29 when there is no signal on the control grid of tube 31.

The stage including tube 18 is identical to that including tube 17 except that resistor 32 is adjusted to provide a greater bias than in the case of tube 17 with the result that a signal must have a greater amplitude to pass tube 18 than tube 17. Video pulses exceeding this amplitude produce negative pulses in the output of tube 18 and positive amplified pulses in the output of tube 33 which are applied to the control grid of section A of tube 34. Tube 34 constitutes a cathode coupled monostable multivibrator identical to that described for tube 24 except that the time constant is made such as to produce a 30 microsecond rather than a 15 microsecond pulse and the negative-going pulse at the anode of section A, rather than the positive-going pulse at the anode of section B, is utilized. This pulse is applied to the grid of cathode follower 31 and produces an identical 30 microsecond pulse at the cathode of this tube and, consequently, on the screen grid of tube 29. The magnitude of this pulse is sufficient to render tube 29 inoperative as an amplifier during its presence on the screen grid. Since the 30µ's negative pulse spans in time the pulse applied to the grid of tube 29 from tube 28, it operates to prevent the passage of this pulse to output terminal 30.

It is therefore seen from the above that a pulse will be produced at terminal 30 only in response to a pulse at terminal 16 whose magnitude lies above a minimum value determined by the setting of resistor 22 and below a maximum value determined by the setting of resistor 32. These values may be represented by the circles $M_1$ and $M_2$, respectively, in FIG. 2. Thus, pulses are produced at terminal 30 for lobes falling within the limits $M_1$ and $M_2$, such as the lobes 33, but not for major lobe 34 and principal minor lobes 34 which lie above $M_2$, nor for lobes having amplitudes below $M_1$.

The pulses occurring at the pulse height discriminator output terminal 30 are applied to the input of variable delay device 37, the details of which are shown in FIG. 5. The incoming pulse is applied by way of input terminal 36 and coupling condenser 37 to the control grid of section A of tube 38. This tube and its associated circuit constitute a cathode coupled monostable multivibrator similar to those incorporating tubes 24 and 34. Since the grid of section B is returned to its cathode the circuit has a stable state in which section B is conductive and section A is cutoff. The incoming positive pulse on the grid of section A initiates conduction in this section and causes the circuit to switch to the unstable state in which section A is conductive and section B is cutoff, the grid of the latter section having been carried below cutoff by the fall in the section A anode potential. The circuit remains in the unstable state until condenser 39 has discharged sufficiently to allow the grid of section B to rise to the cutoff point. At this instant conduction is restored in section B and the circuit reverts to its stable state. In going through the above described cycle of operation a rectangular pulse is generated at the anode of section B. The duration of this pulse is determined by the time constant of the discharge circuit of condenser 39 which may be controlled or varied by variable resistor 40.

In practice an irregular variation of the value of resistance 40 is desired. This may be achieved manually or automatically. A possible means for automatic variation is shown in FIG. 4a. Here three series connected resistors, which are substituted for resistors 40, have their sliders driven from crank pins on gears 41, 42 and 43, the relative speeds of which are preferably nonharmonically related so as to give an irregular nonperiodic variation of the total resistance. The gear train is driven by a pinion 44 which in turn is driven preferably intermittently, as by a Geneva mechanism 45. Another possibility for an irregular variation of the length of the rectangular pulse generated at the anode of section B of tube 38 is shown in FIG. 4b. In this arrangement three sine voltage waves of different frequencies, preferably nonharmonically related, are connected in series in place of resistor 40. By proper selection of the magnitudes of these voltage waves and the magnitudes of condenser 39 and resistor 46, a highly erratic variation of the length of the rectangular pulse may be achieved.

The rectangular pulse generated above is differentiated by a differentiating circuit comprising condenser 47 and resistor 48 to produce sharp positive and negative pulses from the leading and trailing edges, respectively. Only the negative pulse appears on the grid of tube 49, however, since the grid of this tube can not be driven appreciably positive relative to the cathode, and this pulse produces a sharp positive pulse on the anode which is applied to output terminal 50 through cathode follower stage 51.

In the overall circuit of FIG. 5, therefore, the interval between the incoming pulse at terminal 36 and the outgoing pulse at terminal 50 varies in an irregular manner. The pulse at terminal 50 is applied to transmitter 52 and causes this transmitter to radiate a short pulse of high frequency energy to the ground station. The frequency of this pulse is made to equal that of the ground station, the frequency having been determined by the panoramic receiver, and for this purpose the transmitter is one that can be tuned over a relatively wide range of frequencies. The transmitter power output is made sufficiently great for the ground radar station to receive the return pulse through the minor lobe that radiated the triggering pulse to the aircraft.

The circuit so far described fires on the minor lobes of the ground radar that lie between the limits $M_1$ and $M_2$ and produces a pattern of false targets at various ranges on the ground radar P.P.I., as shown in FIG. 6. If the airborne transponder were permitted to fire on all lobes of the antenna an almost continuous triggering of the transponder would occur with the result that adjacent returns would run together on the P.P.I. and produce false targets that are of unrealistic angular extent and therefore easily distinguishable from a true target. By limiting the transponder response to lobes falling within the limits $M_1$ and $M_2$ the response of the transponder is broken up so that the false targets produced are discrete and of realistic angular extent with the result that they can not be readily distinguished from a true target.

Since the total radiation pattern for a parabolic or similar type reflector antenna extends for about 180° and is symmetrical with respect to the main lobe, the field of false targets produced on the P.P.I. of the ground radar will extend over a 180° sector and the echo of the aircraft that it desired to obscure will be somewhere along the bisector 53 of this sector. As a result, the azimuth of the aircraft, if not its range, may be surmised by the enemy. In order to avoid this it is desirable to be able to vary the angular position of the false target sector with respect to the main lobe direction so that the main lobe will not be in the center of the sector and so that its position in the false target sector is unknown to the enemy. The desired situation is represented in FIG. 7 in which the false target sector has been reduced in angular extent and the main lobe direction may be located at various angular positions within the sector.

The above may be accomplished, with switch $S_1$ on contact "b" (FIG. 1), by means of a gated video amplifier 54 controlled by a switch 55 driven from motor 9 at the speed of rotation of coil 5 and the ground station antenna and having provision for adjusting the angle of dwell and the phase of the switch relative to the main lobe. The video signal from receiver 1 is applied to the control grid of tube 54 which is inoperative as long as switch 55, which is in its cathode circuit, is open. Therefore video signals are applied to the pulse height discriminator 11 only when switch 55 is closed. By controlling the dwell angle of this switch the angular extent of the sector of false targets may be varied and by controlling the phase of its operation the position of the sector relative to the main lobe may be varied.

A possible switching device for the above purpose is shown in FIGS. 8a and 8b. Gear 56 is driven by shaft 57, connected to motor 9 (FIG. 1), and worm gear 58 at the speed of coil 5 (FIG. 1) which, as has been explained, is adjusted to equal the speed of the rotating ground search antenna. This gear carries a moving contact 59 designed to engage a stationary contact made up of two arcuate elements 60a and 60b. In the embodiment shown each of these elements is 90° in length but could be made shorter if desired. Element 60a is mounted on arm 61 and element 60b is mounted on arm 62. With the two elements completely overlapped as shown the stationary contact has its minimum angular extent of 90°. By means of thumbscrew 63, arms 61 and 62 may be spread to increase the angular extent of the stationary contact to 180°. Contact 59 has sufficient range to contact element 60b when uncovered by element 60a. Thumbscrew 63, therefore, may be used to set the angular extent of the false target sector to any value between 90° and 180°. The phasing of the sector, or the position of the main lobe within the false target sector when it intercepts the protected aircraft, may be controlled by adjusting the angular position of the fixed contact. This is accomplished by loosening lock nut 64 and rotating the fixed contact assembly to the desired position. The relative position of main lobe and the false target sector may be observed on the screen 8 of cathode-ray tube 6 (FIG. 1) since the transmitter 52 response will be superimposed on the received signal indications on the screen. The switch is connected into the circuit by connecting the cathode of tube 54 to terminal 65, which connects through slip ring 66 to contact 59, and the base of the switch to ground.

The foregoing apparatus produces a more or less random false target distribution on the face of the P.P.I. that does not repeat on each revolution of the scanning antenna. Because of the more regular behavior of a true target it may be possible to identify a true target in the false target field if observed for a sufficient length of time.

With modern high speed aircraft the time available to the ground radar station for obtaining useful positional data is very short with the result that the time required to analyze the confused P.P.I. display is usually sufficient to permit the aircraft to pass without its position and course being ascertained. In cases where longer observation times are available, as with slower aircraft, it may be desirable to produce false targets that behave more nearly like true targets in order to make their differentiation more difficult and time consuming. The apparatus of FIGS. 9 and 10 produces false targets at different azimuths and ranges that have continuous motions across the screen of the P.P.I. that simulate and are generated by the motion of the aircraft.

FIG. 9 illustrates a modification of FIG. 1 for accomplishing the above purpose. Since separation of the false targets is achieved by other means, the pulse height discriminator of FIG. 1 is not utilized in this embodiment. The apparatus comprises separate identical sections for each false target to be generated. A false target section comprises a gate circuit 70, an adjustable delay circuit 71, a cam operated switch 72, a cam 73 and a cam driving mechanism 74. The cams 73 are driven from shaft 75 which in turn is driven from shaft 57 (FIG. 1). The gear ratios are made such that cams 73 turn at the same speed as deflection yoke 5 (FIG. 1). A differential gear 76 is provided in each case for adjusting the phase of the cams relative to the deflection yoke. This adjustment is made by rotating wheel 77 while holding differential carrier gear locking device 78 disengaged.

The video signal from panoramic receiver 1 (FIG. 1) is applied through contact "a" of $S_1$ to all of the gates 70. Each gate is closed to the video signal whenever its associated switch 72 is closed due to the negative bias applied to the gate from source 79. During the interval when a switch 72 is held open by cam 73 any video signals appearing in the output of receiver 1 will be passed by the associated gate to adjustable delay circuit 71. The receiver should have sufficient sensitivity to produce usable video output pulses from minor lobe radiations of the ground radar antenna. Therefore, during each open interval of a switch 72, a series of video pulses, corresponding to the radiated pulses of the ground radar, pass the associated gate 70 and, after a predetermined delay in delay element 71, are applied to transmitter 52 which is triggered thereby to radiate simulated target pulses back to the ground radar.

In using the system of FIG. 9, the speed of motor 9 (FIG. 1) is adjusted to provide a nonrotating pattern on the screen of cathode-ray tube 7. With this adjustment made, the speed of cams 73 relative to the speed of the ground antenna is determined by the rate of change of the azimuth of the aircraft. There are three situations: (1) the aircraft traveling radially with respect to the ground antenna, (2) the aircraft traveling with the rotation of the antenna, and (3) the aircraft traveling against the rotation of the ground antenna. In case (1) there is no change in azimuth of the aircraft and, as the result, the speed of cam 73 is the same as that of the ground antenna. In case (2), the ground antenna must rotate more than one revolution between adjacent interceptions by the main lobe and therefore the yoke 5 and cams 73 must rotate more slowly than the ground antenna to produce a nonrotating pattern on screen 8. In case (3), the ground antenna rotates less than one revolution between adjacent main lobe interceptions and therefore yoke 5 and cams 73 must rotate at a greater speed than the ground antenna to produce a nonrotating pattern on screen 8.

In case (1) the false targets move in a radial direction toward the center of the P.P.I. Their ranges may be made to differ by different adjustments of the delay circuits 71. The radial movement of the false targets is due to the changing range of the aircraft which affects the round trip time interval of the pulses radiated by the ground radar. In cases (2) and (3) the speed differences between the cams 73 and the ground station antenna cause the false targets to appear at slightly different azimuths on the P.P.I. at each revolution of the antenna. The ranges of the false targets, which may be made of different magnitudes by different adjustments of delay circuits 71, also vary as the aircraft range varies. Therefore, in cases (2) and (3), the continuously changing azimuths and ranges cause the false targets to move across the face of the P.P.I. in a manner analogous to the behavior of a true target.

The adjustable delay 71 of FIG. 9 may be of the type shown in FIG. 5. The gating circuit 70 may be of any suitable type such as the diode gating circuit shown in FIG. 10. When switch 72 is closed the anode of diode 80 is made negative relative to its cathode by an amount exceeding the magnitude of the positive pulses applied to terminal 16 so that passage of these pulses is blocked. When switch 72 is open, the negative bias is removed and the pulses pass freely to the delay circuit 71.

I claim:

1. An airborne radio beacon for producing false targets on the plan position indicator of a ground search radar having a rotating directional antenna the field pattern of which has a main lobe and a plurality of minor lobes of less intensity than the main lobe, comprising: a receiver of sufficient sensitivity to produce a video pulse output in response to pulses of high frequency energy radiated by the minor lobes of said antenna; a video pulse height discriminator for passing only those video pulses lying between predetermined lower and upper magnitude limits; means for applying said video pulses to said pulse height discriminator; variable delay means; a transmitter for radiating pulses of energy to said ground radar antenna; means for applying the video pulses passed by said pulse height discriminator to said delay means; and means for applying the delayed output pulses of said delay means as triggering pulses to said transmitter.

2. Apparatus as claimed in claim 1 in which the delay produced by said variable delay means varies in an irregular manner.

3. Apparatus as claimed in claim 2 in which there is provided a gating means situated between said receiver and said pulse height discriminator, and means synchronized with the rotation of said ground antenna for opening said gating means during a predetermined period less than one half the rotational period of said ground antenna and containing the instant at which the main radiation lobe of the ground antenna intercepts said airborne beacon.

4. Apparatus as claimed in claim 3 in which said means synchronized with the rotation of said ground antenna for opening said gate comprises a cathode-ray tube, means for producing a radial deflection of the beam of said tube, means for rotating the direction of said deflection at a constant adjustable speed, means for applying the video output of said receiver to said deflection means for producing a radial deflection of the beam proportional to the video magnitude, a rotary switch having a variable dwell angle driven at the same speed as said rotating sweep, said switch operating to open said gate, and means for varying the phase of said rotary switch relative to said rotating sweep.

5. An airborne radio beacon for producing false targets on the plan position indicator of a ground search radar having a rotating directional antenna the field pattern of which has a main lobe and a plurality of minor lobes of less intensity than the main lobe, comprising: a receiver of sufficient sensitivity to produce a video pulse output in response to pulses of high frequency energy radiated by the minor lobes of said antenna; synchronizing apparatus comprising a cathode-ray tube, means for producing a radial deflection of the beam of said tube, means for rotating the direction of said deflection at a constant adjustable speed, and means for applying the video output of said receiver to said deflection means for producing a radial deflection of the beam proportional to the video magnitude; a plurality of switches, each corresponding to a false target; means for actuating each of said switches once during each revolution of said direction of deflection; a plurality of gate circuits each associated with one of said switches and opened when its associated switch is actuated; means for applying the video pulse output of said receiver to said gate circuits; means for delaying the video pulses passed by said gates by predetermined amounts; a transmitter; means for applying said delayed video pulses to said transmitter for triggering said transmitter; and means for adjusting the phase of each of said switches relative to the said rotating direction of deflection.

References Cited in the file of this patent

UNITED STATES PATENTS

| | | |
|---|---|---|
| 2,440,253 | Dodington | Apr. 27, 1948 |
| 2,885,543 | Williams | May 5, 1959 |

OTHER REFERENCES

Sternlight, Electronic Simulator Gives Countermeasures Targets, Electronics, vol. 31, No. 51; Dec. 19, 1958, pp. 78–80.